United States Patent [19]

Fitzgerald et al.

[11] Patent Number: 4,553,884
[45] Date of Patent: Nov. 19, 1985

[54] BORING TOOL AND METHOD OF REDUCING VIBRATIONS THEREIN

[75] Inventors: Gary W. Fitzgerald, Derry; Robert S. Gulibon, Stahlstown; Paula M. Penrod, Latrobe, all of Pa.

[73] Assignee: Kennametal Inc., Latrobe, Pa.

[21] Appl. No.: 376,613

[22] Filed: May 10, 1982

[51] Int. Cl.$^4$ ............................................. B23B 47/00
[52] U.S. Cl. .................................. 408/143; 409/141; 82/DIG. 9
[58] Field of Search ............... 408/143; 188/311; 409/141; 82/DIG. 9

[56] References Cited

U.S. PATENT DOCUMENTS

| | | | |
|---|---|---|---|
| 2,051,954 | 8/1936 | Leland | 408/143 |
| 2,591,115 | 4/1952 | Austin | 408/143 |
| 3,164,041 | 1/1965 | Carlstedt | 408/144 |
| 3,207,009 | 9/1965 | Carlstedt | 408/143 |
| 3,207,014 | 9/1965 | Carlstedt | 409/141 |
| 3,230,833 | 1/1966 | Shurtliff | 409/141 |
| 3,559,512 | 2/1971 | Aggarwal | 408/143 |
| 3,582,226 | 6/1971 | Shurtliff | 408/143 |
| 3,838,936 | 10/1974 | Andreassen et al. | 408/143 |

FOREIGN PATENT DOCUMENTS

| | | | |
|---|---|---|---|
| 1029675 | 5/1966 | United Kingdom | 408/143 |
| 663493 | 5/1979 | U.S.S.R. | 408/143 |

*Primary Examiner*—Gil Weidenfeld
*Assistant Examiner*—Daniel W. Howell
*Attorney, Agent, or Firm*—Lawrence R. Burns

[57] ABSTRACT

Disclosed is a boring tool resistant to vibration. There is a boring bar having a central bore at one end and a boring bar head for attachment to the boring bar at the one end. Inserted in the bore is a tuned absorber package for eliminating vibrations in the boring tool. The tuned absorber package is self-contained and is transferable between boring bars. Also disclosed is a method of reducing vibrations in the boring tool.

11 Claims, 3 Drawing Figures

BORING TOOL AND METHOD OF REDUCING VIBRATIONS THEREIN

BACKGROUND OF THE INVENTION

This invention relates to the field of metalcutting tools, and more specifically, to those metalcutting tools known as boring bars.

Boring bars, also known as boring tools, are especially useful for the enlargement of an existing hole. Due to the requirements of the work, close tolerances are often required.

The boring bar usually consists of two parts, the boring head and the boring bar itself. In operating the boring bar, the workpiece may rotate while the boring bar remains stationary or the boring bar may rotate while the workpiece rotates.

It is anticipated that the objects of this invention may best be achieved if the workpiece rotates while the boring bar remains stationary.

The boring bar is held at one end of the bar while the boring head contacts the workpiece. The boring bar is thus overhung or cantilevered.

A detrimental condition encountered in the use of boring bars is chatter or self-excited vibration due to the metal cutting process. Chatter is most serious when the vibration of the bar coincides with its natural frequency. This is known as resonance. Consequences of resonance are extreme loss of tolerance, poor surface finish and tool breakage.

It is thus desirable to avoid chatter and resonance.

Under many circumstances, it is possible to avoid chatter by changing the material of the bar so that a higher stiffness material is used; for example, substituting tungsten carbide for steel. Other things that may help are increasing the diameter of the bar or decreasing its overhang. If possible, it is also desirable to support the bar at its overhung end.

If it is not possible to lessen the effect of the vibration in any of the ways just described, it will be necessary to eliminate the vibrations themselves. One way of doing this is by application of a vibration dampening device, several of which are well known in the art. One such vibration dampening device is shown in U.S. Pat. Nos. 3,164,041; 3,207,009; and 3,207,014, all assigned to applicant corporation, and is known as a DeVibrator ®. The prior art vibration dampening device works by absorbing the energy of the vibrations imposed upon the boring bar and then dissipating the energy through random impacts of each inertial disc contained within the vibration dampening device and through friction among the discs themselves. This vibration dampening device is effective over a wide range of vibration frequencies.

Another way of eliminating the vibrations is by the application of a dynamic vibration absorber. A complete treatment of the dynamic vibration absorber can be found in a paper entitled, "The Theory of the Dynamic Vibration Absorber," Transactions ASME, Volume 50, 1928 (Pages 9 to 22). Briefly, the dynamic vibration absorber absorbs the vibrations imposed upon the boring bar and then begins to vibrate itself but at 180 degrees out of phase so as to apply a force equal and opposite to the disturbing force. In this way, detrimental vibrations are effectively eliminated.

The dynamic vibration absorber can be tuned so that it vibrates at a desired frequency. See, for example, U.S. Pat. No. 3,838,936. This desired frequency is most often the natural frequency of the boring bar so that resonance, the most damaging form of vibration, is hopefully eliminated or at least reduced.

However, a problem with the designs of the prior art is that they can become mistuned by the machine operator or even after prolonged use.

Another problem with the designs of the prior art is that damaging vibrations are not reduced to the extent deemed possible.

Thus, it is an object of this invention that the tuned dynamic vibration absorber be resistant to mistuning by the operator.

It is also an object that the tuned dynamic vibration absorber be resistant to mistuning over a prolonged period of use.

It is another object that the dynamic vibration absorber be readily transferable.

It is a further object that the dynamic vibration absorber be capable of being tuned independently of the boring bar.

It is a still further object that the dynamic vibration absorber of this invention be capable of providing improved reduction of damaging vibrations.

BRIEF SUMMARY OF THE INVENTION

According to the present invention, disclosed is a boring tool resistant to vibration comprising a boring bar having a central bore at one end and a boring bar head for attachment by suitable means to the boring bar at the one end. Inserted in the bore is a tuned absorber package for eliminating vibrations in the boring tool. The tuned absorber package is self-contained and is transferable between boring bars.

The boring bar head has a recess aligned with the bore. The tuned absorber package preferably extends into the recess of the boring bar head.

The tuned absorber package comprises an absorber mass, an elastomer support on either end of the absorber mass, a cylindrical canister for receiving the absorber mass and elastomer supports, and an end cap for the cylindrical canister. There is also tuning means interacting with one of the elastomer supports so as to tune the desired vibration frequency of the absorber package.

Preferably, the tuned absorber package further comprises at least one belleville washer between each end of the absorber mass and each of the elastomer supports. The tuned absorber package further comprises at least one steel spacer between each of the belleville washers and each of the elastomer supports.

Most preferably, the tuned absorber package further comprises dampening fluid added to the cylindrical canister. The dampening fluid is preferably silicone oil.

The tuning means comprises a perforation in one end of the cylindrical canister and a pressure plate internal to the cylindrical canister. The pressure plate has a first face communicating with the perforation and a second face contacting one of the elastomer supports. The tuning means further comprises threaded means contacting the first face of the pressure plate and threadedly engaging the perforation.

According to the invention, also disclosed is a tuned absorber package comprising an absorber mass and elastomer support on either end of the absorber mass, a cylindrical canister for receiving the absorber mass and the elastomer supports, and an end cap for the cylindrical canister. The tuned absorber package also has tuning means interacting with one of the elastomer supports so as to tune the desired vibration frequency of the absorber package.

The tuned absorber package further comprises at least one belleville washer between each end of the absorber mass and each of the elastomer supports. Preferably, the tuned absorber package further comprises at least one steel spacer between each of the belleville washers and each of the elastomer supports.

Preferably, dampening fluid is added to the cylindrical canister and, most preferably, the dampening fluid is silicone oil.

The tuning means preferably comprises a perforation in one end of the cylindrical canister and a pressure plate internal to the cylindrical canister. The pressure plate has a first face communicating with the perforation and a second face contacting one of the elastomer supports. There is also threaded means contacting the first face of the pressure plate and threadedly engaging the perforation.

According to the invention, also disclosed is a method of reducing vibrations in a boring tool of the type having a central bore at one end of a boring bar and a boring bar head for attachment to the boring bar at the one end. The method comprises tuning an absorber package to a vibration frequency related to the natural vibration frequency of the boring bar and then inserting the tuned absorber package into the central bore so as to eliminate any self-excited vibrations which the boring bar may encounter.

BRIEF DESCRIPTION OF THE DRAWINGS

The exact nature of the present invention will become more clearly apparent upon reference to the following detailed specification taken in connection with the accompanying drawings in which.

DETAILED DESCRIPTION OF THE INVENTION

Figure 1:
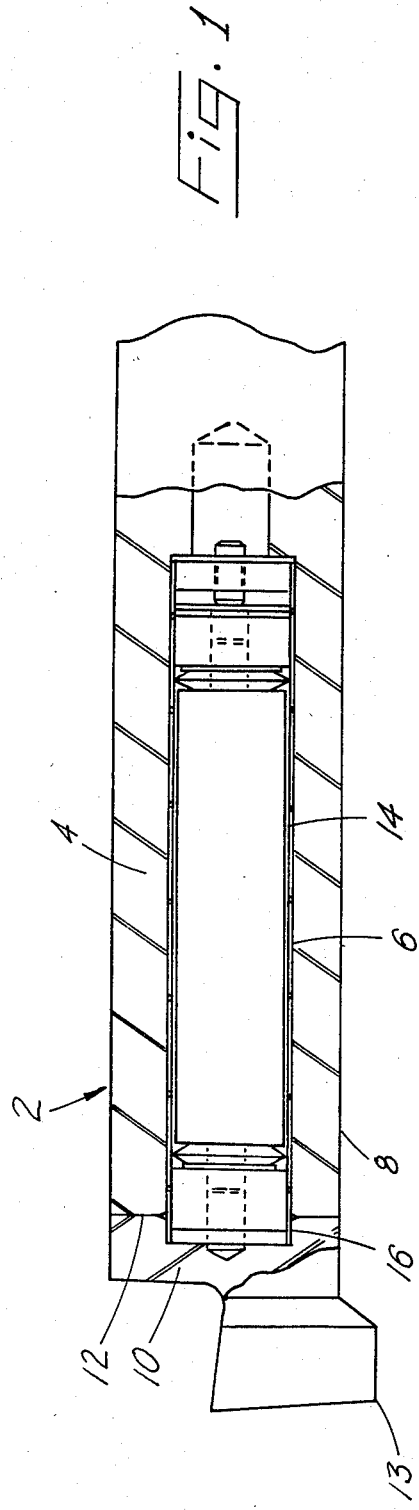
FIG. 1 is a sectional side view of the boring tool according to the present invention.

Referring to the drawings in more detail, FIG. 1 shows a view of a boring tool 2 according to the invention which is resistant to vibration. The boring tool comprises a boring bar 4 having a central bore 6 at one end 8 and a boring bar head 10 for attachment 12 by suitable means to the boring bar at the one end. There is also a tuned absorber package 14 inserted in the bore 6 for eliminating vibrations in the boring tool. The tuned absorber package is self-contained and is transferable between boring bars.

Preferably, the boring bar head 10 has a recess 16 aligned with the bore. The tuned absorber package 14 extends into the recess of the boring bar head. It is most desirable to have the tuned absorber package as close as possible to the cutting portion 13 of the boring tool so as to most effectively eliminate vibrations in the boring tool.

Figure 2:
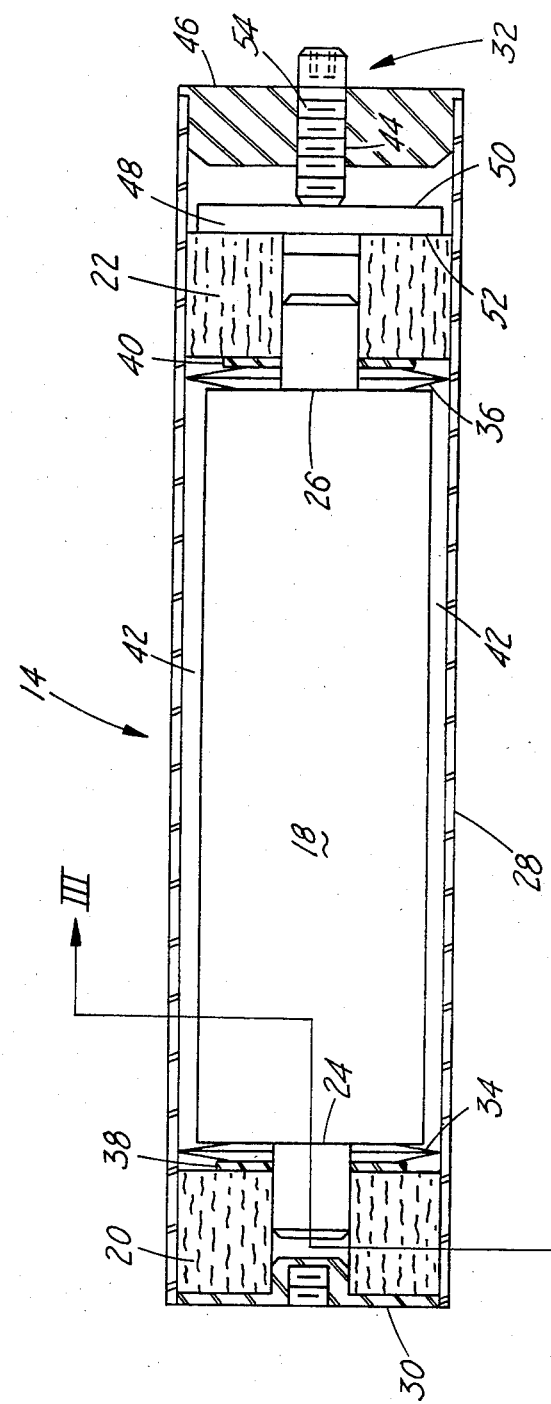
FIG. 2 is an enlarged side view of the tuned absorber package.
Figure 3:
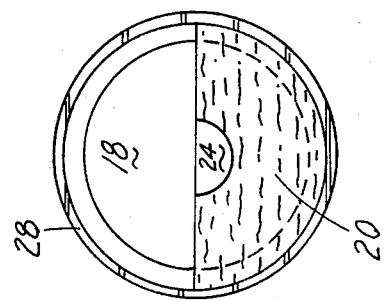
FIG. 3 is a view along line III—III of FIG. 2.

Referring now to FIGS. 2 and 3 in more detail, the tuned absorber package 14 comprises an absorber mass 18, an elastomer support 20, 22 on either end 24, 26 of the absorber mass 18, a cylindrical canister 28 for receiving the absorber mass 18 and the elastomer supports 20, 22, and an end cap 30 for the cylindrical canister 28. There is also tuning means 32 interacting with one of the elastomer supports so as to tune the desired vibration frequency of the absorber package.

It is preferable that the absorber mass be made of tungsten, tungsten alloy or other high density material so as to achieve optimum performance from the absorber package.

Once the tuned absorber package is fully assembled, the end cap would be firmly secured to the canister, as by epoxy or other suitable means.

Preferably, the tuned absorber package 14 further comprises at least one belleville washer 34, 36 between each end 24, 26 of the absorber mass and each of the elastomer supports 20, 22. While the absorber package will work satisfactorily without the belleville washer on each end, it has been found that there is a substantial improvement in the elimination of vibrations when the belleville washers are included in the package. In the most preferred embodiment, it has been found that the most effective use of the absorber package occurs when there are two belleville washers on each end.

Preferably, also, there is at least one steel spacer 38, 40 between each of the belleville washers 34, 36 and each of the elastomer supports 20, 22. The steel spacers have been found to be particularly useful in the tuning of the absorber package.

For the sake of clarity, the belleville washers and the steel spacers are not shown in FIG. 3.

In the most preferred embodiment, the tuned absorber package further comprises dampening fluid 42 added to the cylindrical canister 28. It is most preferable that the dampening fluid is silicone oil.

The tuning means 32 comprises a perforation 44 in one end 46 of the cylindrical canister 28 and a pressure plate 48 internal to the cylindrical canister. The pressure plate has a first face 50 communicating with the perforation 44 and a second face 52 contacting the one of the elastomer supports. There is also threaded means 54 contacting the first face 50 of the pressure plate 48 and threadedly engaging said perforation 44.

According to the invention, there is a tuned absorber package comprising an absorber mass 18, elastomer support 20, 22 on either end 24, 26 of the absorber mass 18, a cylindrical canister 28 for receiving the absorber mass 18 and the elastomer supports 20, 22 and an end cap 30 for the cylindrical canister 28. There is also tuning means 32 interacting with one of the elastomer supports so as to tune the desired vibration frequency of the absorber package.

The tuned absorber package preferably further comprises at least one belleville washer 34, 36 between each end 24, 26 of the absorber mass and each of the elastomer supports 20, 22. While the absorber package will work satisfactorily without either belleville washer, it is preferred that the belleville washers be included. It is most preferred that there are two belleville washers on each end of the absorber mass.

The tuned absorber package most preferably further comprises at least one steel spacer 38, 40 between each of the belleville washers 34, 36 and each of the elastomer supports 20, 22.

In the most preferred embodiment, the tuned absorber package further comprises dampening fluid 42 added to the cylindrical canister 28 and preferably the dampening fluid is silicone oil.

The tuning means 32 comprises a perforation 44 at one end 46 of the cylindrical canister 28 and a pressure plate 48 internal to the cylindrical canister. The pressure plate has a first face 50 communicating with the perforation 44 and a second face 52 contacting the one of the elastomer supports. The tuning means further comprises threaded means 54 contacting the first face 50 of the pressure plate 48 and threadedly engaging the perforation 44.

According to the invention, there is also a method disclosed for reducing vibrations in a boring tool. The boring tool is of the type having a central bore 6 at one end 8 of a boring bar 4 and a boring bar head 10 for attachment 12 to the boring bar at the first end. The attachment of the boring bar head to the boring bar would be by any of the several means which are well known in the prior art. The method comprises tuning an absorber package 14 to a vibration frequency related to the natural vibration frequency of the boring bar and, further, inserting the tuned absorber package 14 into the central bore 6 so as to eliminate any self-excited vibrations which the boring bar may encounter.

Modifications may be made within the scope of the appended claims.

What is claimed is:

1. A boring tool resistant to vibration comprising: a boring bar having a central bore at one end; a boring bar head with means for attachment to said boring bar at said one end; and a tuned absorber package inserted in said bore for eliminating vibrations in said boring tool, said tuned absorber package having means for being self-contained and transferable between boring bars, said tuned absorber package comprising: an absorber mass; an elastomer support on either end of said absorber mass; a cylindrical canister for receiving said absorber mass and said elastomer supports; an end cap for said cylindrical canister; tuning means interacting with one of said elastomer supports so as to tune the desired vibration frequency of said absorber package; and dampening fluid within the cylindrical canister.

2. The boring tool of claim 1 wherein said boring bar head has a recess aligned with said bore and said tuned absorber package extends into said recess of said boring bar head.

3. The boring tool of claim 1 wherein the tuned absorber package further comprises at least one belleville washer between each end of said absorber mass and each of said elastomer supports.

4. The boring tool of claim 3 wherein the tuned absorber package further comprises at least one steel spacer between each of said belleville washers and each of said elastomer supports.

5. The boring tool of claim 1 wherein the dampening fluid is silicone oil.

6. The boring tool of claim 1 wherein the tuning means comprises a perforation in one end of said cylindrical canister; a pressure plate internal to said cylindrical canister and having a first face communicating with said perforation and a second face contacting said one of said elastomer supports; and threaded means contacting said first face of said pressure plate and threadedly engaging said perforation.

7. A tuned absorber package comprising: an absorber mass; an elastomer support on either end of said absorber mass; a cylindrical canister for receiving said absorber mass and said elastomer supports; an end cap for said cylindrical canister; tuning means interacting with one of said elastomer supports so as to tune the desired vibration frequency of said absorber package; and dampening fluid within the cylindrical canister.

8. The tuned absorber package of claim 7 further comprising at least one belleville washer between each end of said absorber mass and each of said elastomer supports.

9. The tuned absorber package of claim 8 further comprising at least one steel spacer between each of said belleville washers and each of said elastomer supports.

10. The boring tool of claim 7 wherein the dampening fluid is silicone oil.

11. The tuned absorber package of claim 7 wherein the tuning means comprises a perforation in one end of said cylindrical canister; a pressure plate internal to said cylindrical canister and having a first face communicating with said perforation and a second face contacting said one of said elastomer supports; and threaded means contacting said first face of said pressure plate and threadedly engaging said perforation.

* * * * *